Figure 1:
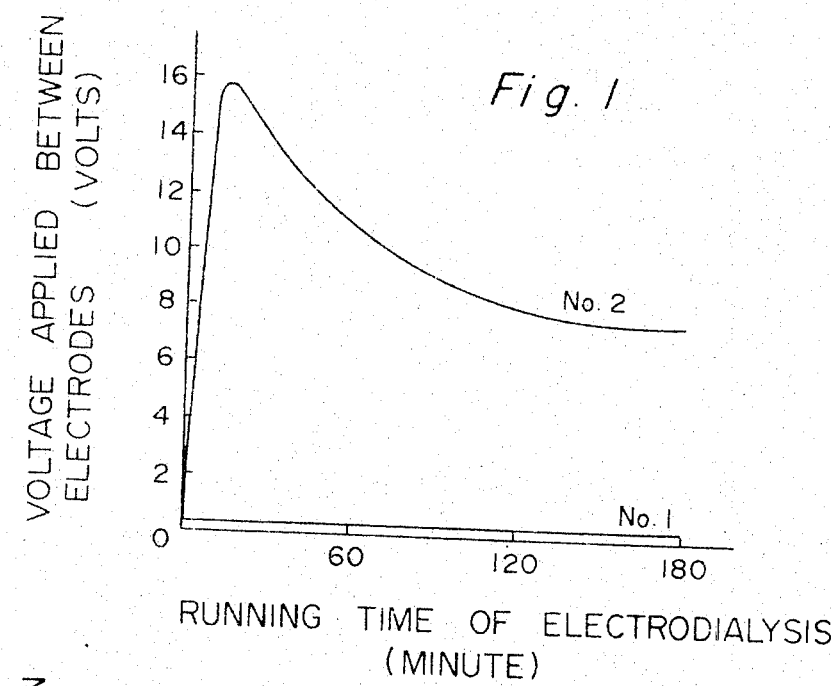

United States Patent [19]
Mizutani et al.

[11] 3,784,457
[45] Jan. 8, 1974

[54] PROCESS FOR REMOVING ELECTROLYTES FROM AQUEOUS SOLUTION

[75] Inventors: Yukio Mizutani; Toshikatsu Sata, both of Tokuyama; Ryuji Izuo, Kudamatsu, all of Japan; Reiichi Yamane, deceased, late of Tokuyama, Japan by Masako Yamane, heir

[73] Assignee: Tokuyama Soda Kabushiki Kaisha, Tokuyama-shi, Yamaguchi-ken, Japan

[22] Filed: Sept. 13, 1971

[21] Appl. No.: 179,992

[30] Foreign Application Priority Data
Sept. 14, 1970   Japan.......................... 45-79992/70

[52] U.S. Cl............................ 204/180 P, 204/301
[51] Int. Cl............................................ B01d 13/02
[58] Field of Search ...................... 204/180 P, 301

[56] References Cited
UNITED STATES PATENTS

| | | | |
|---|---|---|---|
| 3,276,989 | 10/1966 | Nishihara et al. | 204/296 |
| 3,276,990 | 10/1966 | Hani et al. | 204/296 |
| 3,276,991 | 10/1966 | Hani et al. | 204/296 |
| 3,510,417 | 5/1970 | Mizutani et al. | 204/180 P |
| 3,510,418 | 5/1970 | Mizutani et al. | 204/180 P X |
| 3,654,125 | 4/1972 | Leitz | 204/301 |
| 3,677,923 | 7/1972 | Bier | 204/180 P |

*Primary Examiner*—John H. Mack
*Assistant Examiner*—A. C. Prescott
*Attorney*—Sherman and Shalloway

[57] ABSTRACT

A process for removing electrolytic substances from water which comprises electrodialyzing an aqueous solution containing electrolytic substances using an ion-exchange membrane to remove the electrolytic substances from the aqueous solution, such exchange membrane consisting of an insoluble, infusible synthetic organic polymer having dissociable ionic groups chemically bonded thereto and having pores through which ions can pass the membrane, at least one substantial surface of the ion-exchange membrane intimately retaining an electrolytic substance having an opposite electric charge to the charge of the ion-exchange group of the ion-exchange membrane and being incapable of passing through the pores of the ion-exchange membrane.

4 Claims, 2 Drawing Figures

PROCESS FOR REMOVING ELECTROLYTES FROM AQUEOUS SOLUTION

This invention relates to a process for removing electrolytes from water by the electrodialysis method using an ion-exchange membrane which comprises removing electrolytic substances from an aqueous solution containing such electrolytic substances to thereby give water containing the electrolytic substances in lower concentrations, preferably water suited for agricultural, industrial or drinking purposes.

Generally, the contents of salts allowed for potable water are up to about 500 ppm, and in the production of potable water now being practiced, attempts are made to reduce the contents of salts to 100–200 ppm or below. Industrial water, too, requires high quality similar to that of potable water according to a particular use, for instance when used as cooling water for rolling steels. Therefore, except for some special instances, industrial water should also contain as little salts as possible in order to exhibit goods results in a specific use.

In recent years, with the increase of urban population and the development of industry, the problem of shortage of water for household, agricultural and industrial uses has been seriously considered. Studies have been made, therefore, as to a process for producing water for drinking and industrial uses by removing salts from sea water, lake water, river water, underground water, and other aqueous solutions containing the salts in high concentrations, or a process for regenerating waste water or sewage water which has been used once. One advantageous procedure has emerged from the studies, in which the salts are removed by electrodialysis using an ion-exchange membrane, and has attracted attention.

Natural river or lake water, however, contains organic matter such as humic acid. There is also the discarding of detergents in rivers or lakes, and recently, the river or lake water usually contains organic matter in a concentration of several to several hundred ppm or above. Likewise, industrial waste matter frequently contains various organic, ionic substances. For example, the pulp spent liquor contains ligninsulfonic acid of low molecular weight and also acetic acid. Furthermore, in the processing of foodstuffs, acids, salts or bases may be required to be removed from aqueous solutions containing organic matters, for example the removal of acids from fruit juices, or the removal of salts of milk.

When such river water or waste water is electrodialyzed using an ion-exchange membrane, organic substances such as detergents or low molecular weight ligninsulfonic acids adhere to the ion-exchange membrane, and deteriorate the excellent quality of ion-exchange membrane. Typical deteriorating phenomena are: the electrical resistance of the ion-exchange membrane increases exceedingly and as a result, electric power unit increases remarkably; due to the so-called neutrality disturbing phenomenon which causes changes in pH of feed water and concentrated solution, the alkaline earth metal salts contained in the aqueous solution deposit on the surface of the ion-exchange membrane as carbonates or hydroxides, which may lead to complete failure of electrodialysis; or the current efficiency is decreased.

An object of the present invention is to provide a process for removing electrolytic substances from water solutions containing the electrolytic substances by the electrodialysis method using an ion-exchange membrane, in which the removal of the electrolytic substances can be performed efficiently without undesirable phenomena such as the increased electrical resistance of the electrodialysis system, the neutrality disturbing phenomenon, or the reduction in current efficiency, even when some organic matters detrimental to electrodialysis are present in the aqueous solution.

Other objects of the invention will become apparent from the following description.

According to the present invention, a process is provided for removing electrolytic substances from water which comprises electrodialyzing an aqueous solution containing electrolytic substances using an ion-exchange membrane to remove the electrolytic substances from the aqueous solution, said exchange membrane consisting of an insoluble, infusible synthetic organic polymer having dissociable ionic groups chemically bonded thereto and having pores through which ions permeate, at least one substantial surface of the ion-exchange membrane intimately retaining an electrolytic substance having an opposite electric charge to the charge of the ion-exchange group of the ion-exchange membrane and being incapable of passing through the pores of the ion-exchange membrane.

The invention will be described below in further detail.

Figure 2:
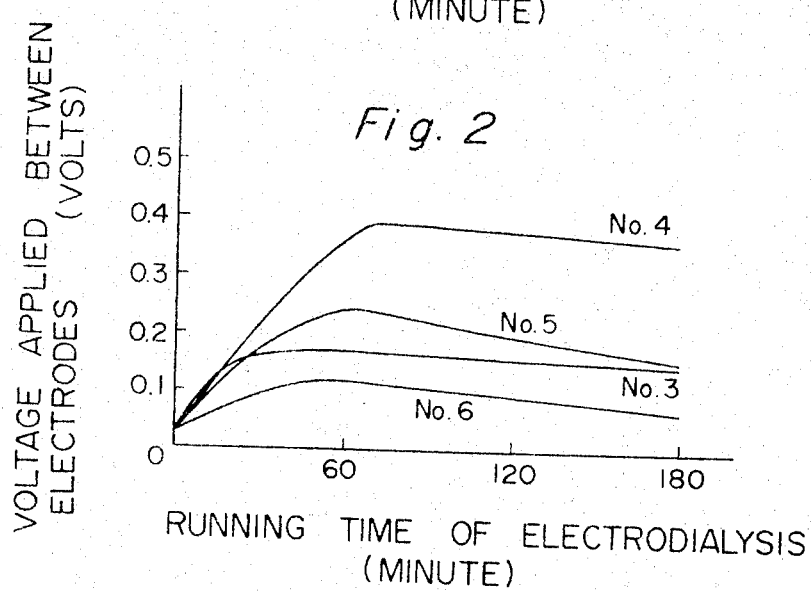

In the accompanying drawings:

FIG. 1 is a graphic representation showing the changes of voltage with time in Referential Example, and FIG. 2 is a graphic representation showing the changes of voltage with time in Example 1.

A thorough investigation was made concerning the deposition of ionic organic matters on the ion-exchange membrane and its marked reduction of the function of the ion-exchange membrane as described above. As a result, it was found that the ionic organic matters are mainly anionic or cationic substances having a molecular weight of about 100 to 300, and that these ionic substances not only deposit on the surface of the ion-exchange membrane but also partly permeate through pores of the ion exchange membrane, which in turn may cause the blockage of pores, or in some case, render the bipolar ion-exchange membrane to cause polarization, making it difficult for the electrolytic ions to move. It has also been found that ionic substances having lower molecular weights, such as acetic acid, can pass through the pores of the ion-exchange membrane easily, and thus do not cause serious troubles. Furthermore, it has been found that substances having larger molecular weights may deposit on the surface of the ion-exchange membrane, but cannot pass through the pores because of large sizes, thus hardly giving any trouble.

The process of the present invention is based on the above-described new findings, and the critical feature of the present invention is that electrodialysis is performed using an ion-exchange membrane having been subjected to a special surface treatment. The ion-exchange membrane itself is well known in the art, and is a membranous polymeric substance composed of an insoluble, infusible synthetic organic polymer having dissociable ionic groups bonded chemically thereto. In many cases, this membranous polymeric substance has a cross-linked structure, and it is of a structure having pores through which ions permeate. The ion-exchange membrane used in the present invention is characteristic in that its surface and a very shallow inner portion containing the surface (in the present specification and claims, these will be generically termed "substantial surface") have been modified with a specific treating agent so that the "substantial surface" intimately retains an electrolytic substance having an opposite electric charge to the charge of the ion-exchange membrane and being incapable of passing through the pores of the ion-exchange membrane. The term "the substantial surface of the ion-exchange membrane intimately retains the electrolytic substance" means that either the electrolytic substance is strongly adsorbed to the surface mainly by an electrostatic force, or it is chemically bonded to the surface by a covalent bond.

That the electrolytic substance having an opposite electric charge to the charge of the ion-exchange membrane used in the present invention should not pass the pres of the ion-exchange membrane is one of the important requirements of the present invention. Specific conditions for realizing this requisite somewhat differ depending upon whether the electrolytic substance is adsorbed to the substantial surface of the ion-exchange membrane or whether it is chemically bonded to the substantial surface by a covalent bond. Where the electrolytic substance is intimately maintained by adsorption, the molecular weight of the electrolytic substance is of utmost importance, and the essential requirement for the electrolytic substance not to enter the pores is that the molecular weight of the electrolytic substance should be at least 400, preferably above 1000. On the other hand, when the electrolytic substance is maintained intimately by the ion-exchange membrane by a covalent bond, the electrolytic substance is integrated with the membranous polymer and the whole constitutes macromolecules. Since the electrolytic substance is completely restrained by this from free movement, even if the electrolytic substance has a low molecular weight, the electrolytic substance never permeates through the pores of the ion-exchange membrane. Accordingly, it will be understood that in the latter case, no limitation as to the molecular weight is necessary.

The amount of the electrolytic substance to be present on the substantial surface of the ion-exchange membrane should be at least sufficient for the electric charge of the electrolytic substance to neutralize the charge of the ion-exchange membrane present on the substantial surface, preferably should be such that the electric charge of the electrolytic substance is excessive. Generally, the larger the amount of the electrolytic substance, the more difficult it is for the organic matter to contaminate the ion-exchange membrane. But if the electrolytic substance is present in too large an amount, it may induce undesirable hydrolysis of water which is quite irrelevant to the objects of the present invention. Therefore, the use of too much electrolytic substance should be avoided. Generally, the amount of the electrolytic substance to be present on the substantial surface should be within the range of $2 \times 10^{-6}$ m.eq./dm$^2$ to 0.5 m.eq./dm$^2$ based on the amount of the dissociable groups contained therein, preferably within the range of $2.5 \times 10^4$ m.eq./dm$^2$ to $5.0 \times 10^{-2}$ m.eq./dm$^2$. The presence of the electrolytic substance of such an amount can be accomplished by using more than 0.0001 mg/dm$^2$, preferably more than 0.001 mg/dm$^2$, and not more than 500 mg/dm$^2$ of the electrolytic substance.

The production of the ion-exchange membrane used in the invention which has been subjected to a special surface treatment will be described in detail below. As an ion-exchange membrane to be surface-treated with the treating agent used in the invention, not only may a membranous polymeric substance having ionic groups chemically bonded thereto be used, but also membranous polymeric substances in the form in which ion-exchange groups can be readily introduced by post-treatment can be used. Examples of the latter type include membranous polymeric substances having an aromatic ring in which a sulfonic acid or amino group can be easily introduced, or membranous polymeric substances having chemically bonded thereto functional groups readily convertible to ionic groups, such as haloalkyl groups, halosulfone groups, halocarbonyl groups, carboxylic anhydride residues, or alkyloxycarbonyl groups (R—O—CO—). In the present specification, the membranous substances in the form in which an ion-exchange group can be readily introduced by post-treatment will sometimes be called merely "raw membrane." The introduction of an ion-exchange group into the raw membrane by post-treatment may be performed before or after an electrolytic substance having an opposite electric charge is intimately held on the substantial surface of the raw membrane using the treating agent.

When electrodialysis is performed using the ion-exchange membrane used in the invention, various troubles encountered in the conventional electrodialysis for removal of electrolytes hardly occur, and the electrolytes can be removed from the aqueous solution with good efficiency. While no detailed mechanism of this process has yet been elucidated, it is assumed that the following are the reasons for the very good efficiency of the process of the present invention. When an ion-exchange membrane not surface-treated is used for removal of salts by electrodialysis, very small amounts of detrimental ionic organic substances contained in water containing the salts to be electrodialyzed (to be referred to as raw water), such as cationic or anionic surface active agents or ionic substances having a molecular weight of 100 to 300, first adhere to the surface of the ion-exchange membrane. The organic matter permeates through the pores of the ion-exchange membrane, and then is bonded electrostatically with the exchange groups of the ion-exchange membrane. Therefore, the organic matter blocks the pores of the ion-exchange membrane, and in some cases, forms a layer having an opposite charge to the ion-exchange group present on the surface of the ion-exchange membrane to which the organic matter has adhered. This in turn causes an increase in electric resistance, a decrease in current efficiency, and hydrolysis of water in an interface layer between the anionic exchange membrane portion and the cationic exchange membrane portion, and also the neutrality disturbing phenomenon. In contrast, the surface of the ion-exchange membrane used in the present invention has a neutral charge or an opposite charge to the electric charge of the inside of the ion-exchange membrane. Therefore, organic ions such as detergents which are pulled towards the surface of the membrane by electrophoresis are prevented from forming an electrical bond on the surface of the membrane, and therefore, this prevents the organic ions from depositing on the surface of the membrane or permeating into the interior of the membrane. Consequently, the occurrence of the undesirable phenomena mentioned above can be avoided. The foregoing assumption, it is believed, will also be supported by FIGS. 1 and 2 of the accompanying drawings which show the experimental results obtained in Referential Example and Example 1.

As the ion exchange group having an opposite charge for electrically neutralizing the ion exchange group on the substantial surface of the ion exchange membrane, there are exemplified, in the case of an anionic exchange membrane, a sulfonic acid group, a sulfate group, a carboxyl group, a phosphoric acid group, a phenolic hydroxyl group, a boric acid group, an arsenic acid group, complex salts of transition metals having a negative electric charge, or groups of salts of these. Specific examples of the substance having such an ion exchange group include polystyrenesulfonic acid, polyvinylsulfonic acid, and salts of these; sulfuric ester of polyvinyl alcohol, and salts thereof; polyacrylic acid, polymethacrylic acid, and salts of these; copolymers of acrylic or methacrylic esters with at least one vinyl monomer capable of having a negative charge such as maleic acid, itaconic acid, styrenesulfonic acid, or vinylsulfonic acid; a condensation product of naphthalenesulfonic acid and formalin; ligninsulfonic acid; alkylphosphoric acids and their salts; cellulose derivatives such as carboxy methylcellulose and its salts; complex salts having a negative electric charge, which contain an alkaline earth metal such as Mg and Ca and a transition metal such as Co, Ni and Fe as a central metal, and ammonia, ethylene diamine, triethylene tetramine, tetraethylene pentamine, amino acids, etc., as a ligand; and sodium polyphosphate, all having a molecular weight of at least 400.

In the case of a cationic exchange membrane, compounds having in the molecule a primary, secondary or tertiary amino group, a quaternary ammonium salt, a stibonium base, or an arsonium base, and complex salts of transition metals having a positive electric charge can be exemplified. Specific examples of compounds having such dissociable groups include polyvinyl pyridines and their quaternary salts; polyvinyl imidazoles and their quaternary salts; polyethylenepolyamines and their derivatives; polyaminostyrene, poly(N-alkylaminostyrene), Poly-N-dialkylaminostyrenes, and poly-N-trialkylammonium-styrene salts; polyvinyl trialkylbenzyl ammonium salts; polyvinylamine, polyallylamine; and complex salts having a positive electric charge, which contain an alkaline earth metal such as Mg or Ca and a transition metal such as Co, Ni, or Fe as a central metal and ammonia, ethylene diamine, triethylene tetramine, tetraethylene pentamine, amino acids, etc. as a ligand, all having a molecular weight of at least 400. In addition to the foregoing, amphoteric electrolytic substances with a molecular weight of at least 400 such as alkylaminoethyleneglycines, 1-hydroxyethyl-1-carboxyethyl-2-undecyl imidozoline, or adenosine-triphosphate may also be cited as being applicable both to the cationic and anionic exchange membranes.

The ion exchange membrane to be used in the present invention can be produced by the following methods (i), (ii), and (iii).

The first of these methods (i) comprises applying to at least one surface of a known ion exchange membrane a substance having a molecular weight of at least 400. Preferably at least 1,000 and a dissociable group having an opposite charge to the charge of the ion exchange membrane to electrically neutralize the ion exchange group on at least one surface of the ion exchange membrane, or causing an excess of an opposite electric charge of the electrolytic substance applied to be present on at least one surface of the ion exchange membrane. The application of the electrolytic material to the surface of the ion exchange membrane can be performed by any desired means such as immersion of the exchange membrane in a solution, preferably an aqueous solution, of the treating agent, coating the treating agent on the surface of the ion exchange membrane, or spraying it onto the surface. Or a method can be employed which comprises continuously or intermittently feeding an aqueous solution of the treating agent to a solution from which salts are to be removed, using an electrodialysis apparatus using an ion-exchange membrane, passing an electric current, and applying the treating agent on the substantial surface of the ion-exchange membrane by electrophoresis.

Specific examples of the treating agent which can be used according to the above mentioned method include polystyrenesulfonic acid, polyvinylsulfonic acid and salts of these; sulfuric or phosphoric esters of polyvinyl alcohol, and salts of these; polymers of unsaturated caroxylic acids such as acrylic acid, methacrylic acid, maleic acid, or itaconic acid, copolymers of at least one monomer having a negative charge such as styrenesulfonic acid, vinylsulfonic acid or above-mentioned unsaturated carboxylic acids, with a copolymerizable monomer such as styrene, vinyl toluene, acrylonitrile, methyl acrylate, methyl methacrylate, vinyl chloride, vinyl acetate, vinylidene chloride, acenaphthylene, vinyl ketone, butadiene, or chloroprene; sodium tripolyphosphate; a condensation product of phenolsulfonic acid and formalin; condensation products of benzaldehyde-2,4-disulfonic acid, naphtholsulfonic acid, sodium salicylate, or sodium phenoxyacetate and aldehydes such as formalin, paraformaldehyde, glyoxal, or furfural; high molecular weight ligninsulfonic acid and its salts; a condensation product of naphthalenesulfonic acid and formalin; alginic acid; gum arabic; polyuronic acid; and carboxymethylcellulose, all of which are applicable to the anionic exchange membrane.

Applicable to the cationic exchange membrane are, for example, polyalkylamines; polyvinylpyridienes and their quaternary salts; polyvinylimidazoles and their quaternary salts; polyethylenepolyamines and their derivatives; polyaminostyrenes, poly-N-alkylaminostyrenes, poly-N-dialkylaminostyrenes; and poly-N-trialkylammonium styrene salts; polyvinyltrialkylbenzylammonium salts; other soluble polymers having a primary, secondary or tertiary amine or a quaternary ammonium salt such as polyallylamine or polyvinylamine;

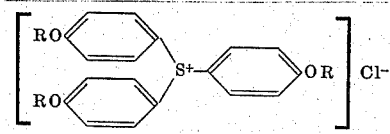

soluble polymers having a tertiary sulfonium base such as poly-methylthioethylacrylate, poly(vinylbenzyl sulfonium), or poly(diallyl sulfonium); and other soluble polymers having a quaternary phosphonium base such as poly(vinyl phosphonium), poly(acrylic phosphonium), poly(vinylbenzyl phosphonium),

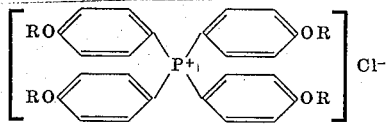

(wherein R is alkyl), or poly(condensation phosphonium), which are soluble cationic natural or synthetic high polymers.

Also alkylaminoethyl glycin, adenosine triphosphate, proteins such as gelatin or casein, and 1-hydroxyethyl-1-carboxyalkyl-2-alkylimidazolines which are treating agents applicable both to the cation exchange membrane and anion exchange membrane can be used.

The methods (ii) and (iii) to be described are based on the covalent bonding of the treating agent and the ion-exchange membrane.

Method (ii) involves causing the treating agent to be adsorbed on the surface of the ion-exchange membrane, and then graft-copolymerizing them with each other by a radical-generating means such as light, X-ray, radioactive ray, or corona discharge. As previously mentioned, in the case of using methods (ii) and (iii), it is not necessary for the treating agent itself to have a molecular weight of at least 400. Therefore, in addition to those exemplified with respect to method (i) above, for cation exchange membranes, vinyl imidazoles, vinyl anilines, vinyl N-trialkylbenzyl ammonium salts, vinyl N-dialkylbenzylamines, or vinyl N-monoalkylbenzylamines may also be used as the treating agents, and these may be graft-copolymerized with styrene, vinyl chloride, vinyl acetate, acrylonitrile, methyl acrylate, methyl methacrylate, vinylidene chloride, acenaphthyene, vinyl ketone, divinyl benzene, divinylsulfone, butadiene, or chloroprene. For anion exchange membranes, vinyl monomers which are anionic or capable of being anionic upon post-treatment, such as styrenesulfonic acid, vinylsulfonic acid, allylsulfonic acid, acrylic acid, methacrylic acid, maleic acid, itaconic acid, or salts or esters of these may be polymerized or copolymerized similar to the case of the cation exchange membranes. The graft-copolymerization may be effected advantageously by using photosensitizers or radical initiators at the same time.

Method (iii) can be performed by any of the following procedures (a) to (d).

Procedure (a) comprises haloalkylating only the substantial surface of a raw membrane or a polymeric membrane, treating the surface with an electrolyte having a primary, secondary or tertiary amine group, and then sulfonating the interior of the membrane in a customary manner to form a cation exchange membrane. Examples of the amino compound that can be used conveniently in this procedure include aromatic amines such as aniline, phenylene diamines, or phenylene triamines; aliphatic amines such as ammonia, hydrazine, alkylamines, dialkylamines, trialkylamines, ethanolamine, diethanolamine, triethanolamine, ethylenediamine, diethylene triamine, triethylene tetramine, or tetraethylene pentamine; polymers having a primary, secondary, or tertiary amino group such as polyethylene imine, polyvinvyl pyridines, polyvinyl amine, polyallylamine, or polyvinyl imidazole; and heterocycle compounds having a primary, secondary, or tertiary amino group such as dipyridine, tripyridine, tetrapyridine, pyridine, aminoquinones. Dyes such as Bismarck Brown G. (C.I 21000), Janus-Brown R (C.I.-33505), Basic Blue Co. (C.I.-52025), New Methylene Blue NSCONE (C.I.-52030), or Bromocyanine BXCONC can also be used.

Procedure (b) comprises haloalkylating a raw membrane or polymeric membranous substance uniformly to its interior, contacting the surface of the membrane with a compound having at least one functional group which is capable of becoming a cationic exchange group and at least one primary, secondary, or tertiary amino group to thereby cause the cationic exchange group only on the substantial surface of the membrane, and then aminating the haloalkyl group in the interior of the membrane with ammonia or an amino compound such as alkylamines, dialkylamines, trialkylamines, monoethanolamine, diethanolamine, triethanolamine, or dimethyl monoethanolamine to form an anion exchange membrane. Examples of the compounds having both an amino group and a functional group capable of becoming a cationic exchange group include amino acids, iminodiacetic acid, aminophenols, aminocresols, aminocaproic acids, aminotoluenesulfonic acids, anilinesulfonic acids, aminobenzoic acids, aminonaphthalenesulfonic acids, aminonaphtholsulfonic acids (for example, 8-amino-1,3,6-naphthalenetrisulfonic acid, 4-amino-1-naphthalenesulfonic acid, or salts of these), aminosalicylic acids and their salts, and dyes having a primary, secondary, or tertiary amino group and a functional group capable of becoming an anion such as sulfonic acid or carboxylic acid groups, the examples of the dyes being Diamond Fast Red B (C.I-17075), Mitsui Anthracene Blue SWGG (C.I.-58805), Fast Acid Green SS (C.I.-20440), Chrome Fast Green S (C.I.-26925), or Yamada Chrome Brown GL.

Procedure (c) comprises introducing into the substantial surface the raw membrane at least one of sulfonyl halide, carboxylic acid halide, phosphonyl halide, phosphorus halide ($-PX_n$) (wherein $n$ is 2 or 4 and X is halogen), or carboxylic anhydride group (these groups will be referred to generically as acid halide group), treating it with a primary, secondary, or tertiary amino compound to form an acid amide bond or a P-N bond, and thereafter introducing a cationic exchange group into the interior of the membrane by a chemical reaction such as sulfonation or converting it to a cationic exchange group by such means as hydrolysis. An alternative process comprises preparing a raw membrane having the above-mentioned acid halide group only on the substantial surface thereof. hydrolyzing it or contacting it with a compound having at least one functional group capable of becoming a cationic exchange group and at least one primary or secondary amino group as mentioned above with respect to (b) to thereby cause the cationic exchange group to be present only on the substantial surface of the membrane, and thereafter introducing an anionic exchange group into the interior of the membrane by the conventional method such as chloromethylation followed by amination or converting it to an anionic exchange group, to thereby form an anionic exchange membrane to be used in the present invention. Specific examples of the amino compound that is suited for use according to this procedure include ethylene diamine, diethylene triamine, triethylene tetramine, tetraethylene diamine, tetraethylene pentamine, 2-aminopyridine, 3-aminopyridine, 4-aminopyridine, piperazine, ethanolamine, diethanolamine, p-aminosalicylic acid, m-aminosalicylic acid, known amino acids, aminopterine, aminoquinolines, aminophenols, aminomethylphenols, aminomethylthiazoles, aminobenzoic acids, amidol, aminoacetophenone, aminobenzophenone, vitamins having a primary or secondary amino group, iminodiacetic acid, 2,4-dinitrophenyl hydrazine, phenylene diamine, dicyandiamide, phthalimide, phenylglycine, Bismarck Brown (C.I-21000), Auramine conc (C.I-41000), Magenta (C.I-42510), Chrysoidine Crystal (C.I-11270), polyethyleneimine, polyvinylamine, polyallylamine, and polyaminostyrene.

Procedure (d) involves treating only the surface of a raw membrane whose interior contains uniformly at least one of the acid halides mentioned with respect to procedure (c) above, with a primary or secondary amine to cause an anionic exchange group to be present on the surface of the membrane, and thereafter hydrolyzing the acid halide group present inside the membrane and introducing a cationic exchange group into the interior of the membrane, to thereby form a cation exchange membrane. The amines suitable for use in this procedure are the same as those exemplified with respect to procedure (c). In an alternative procedure, the acid halide group alone on the substantial surface of the membrane is hydrolyzed to cause a cationic exchange group to be present, and on the other hand, the acid halide group present inside the membrane is treated with a polyamine such as diamines or triamines to introduce an anionic exchange group into the interior of the membrane and to form an anion exchange membrane.

The treatment of the substantial surface only of the membranous substance can be readily achieved by shortening the time during which the membrane is immersed in the treating liquid, or employing mild treating conditions such as the treating temperature or the concentration of the treating agent. Also this can be readily accomplished by coating or spraying the treating liquid on the substantial surface. It is to be noted that the special surface treating means useful in the present invention is not limited to the procedures illustrated above.

In the present invention, any known electrodialysis method and apparatus can be used. In actual operation according to the process of the invention, pure water is produced by electrodialysis at room temperature to 90°C. using an apparatus wherein a plurality of cation exchange membranes and anion exchange membranes are aligned alternately to form passes of a feed solution and passes of a concentrated solution alternately. The ion exchange membranes should be so disposed that their surfaces subjected to the specific surface treatment of the present invention at least come into contact with the feed solution.

According to another aspect of the present invention, a process is provided for removing electrolytes from water, which comprises disposing cation exchange membranes and anion exchange membranes alternately in an aqueous solution containing electrolytes to thereby form a plurality of chambers containing the ion exchange membranes as partition walls, and passing a direct current in series through the chambers to thereby pass cations and anions present in the aqueous solution through the cation exchange membranes and anion exchange membranes respectively and therefore reduce the concentrations of the electrolytes in the aqueous solution, each of the exchange membranes consisting of an insoluble, infusible synthetic organic polymer having dissociable ionic groups chemically bonded thereto and having pores through which ions pass the membrane, at least one substantial surface of the ion-exchange membrane intimately retaining an electrolytic substance having an opposite electric charge to the charge of the ion-exchange group of said ion-exchange membrane and being incapable of passing through the pores of the ion-exchange membrane.

Some of the ion-exchange membranes that are used in the present invention have already been known to be useful for concentrating sea water, but none of them has ever been used for removing salts from water. It is surprising that according to the process of the present invention, an electric resistance does not increase remarkably, the current efficiency is not reduced during the electrodialysis procedure, and also the neutrality disturbing phenomenon hardly occurs.

The following Examples and Comparative Examples will illustrate the present invention, and are not intended in any way to limit the scope of the invention.

The ion-exchange membranes used in these Examples and Comparative Examples were pre-treated. In the case of those used after adsorbing electrolytic substances thereto, cation exchange membranes were immersed alternately in 1.0N HCl and 0.5N NaCl to equilibrate their properties fully, and then equilibrated with a measuring solution not containing organic ions; anion exchange membranes were immersed alternately in 1.0N HCl and 0.5N $NH_4OH$ to equilibrate its properties fully, and then equilibrated with the above solution. In the case of those having the electrolyte chemically bonded thereto by a covalent bond, cationic exchange membranes were treated with 1.0N HCl and 0.5N NaCl to equilibrate its properties; anionic exchange membranes were treated with 1.0N HCl and 0.5N $NH_4OH$ to equilibrate its properties.

The two-chamber type cell used was a cell made of acrylic resin consisting of two chambers each having an inner volume of 120 cc and having an ion-exchange membrane with an ion-exchange area of $5 \times 2$ $cm^2$. Within the cell silver-silver chloride electrodes were provided for passing an electric current and probe-silver-silver chloride electrodes spaced from each ion-exchange membrane surface by a distance of 2 mm for measuring voltage. The probe-electrodes were connected to an X-t recorder to measure the changes with time of the electric resistance of the membrane during the electrodialysis. At the same time, after passing an electric current for a predetermined period of time, the pH and current efficiency of the solution were also measured. The current efficiency was determined by the following equation using a copper coulometer.

$$\text{Current efficiency} = \frac{\text{Equivalents of ions transported through the membrane}}{\frac{\text{Weight increase of copper plate}}{31.77}} \times 100$$

The electrical resistance of the membrane was measured in 0.5N NaCl aqueous solution at 25°C. at alternating current of 1000 cycles.

REFERENTIAL EXAMPLE

A pasty mixture composed of 100 parts of finely divided polyvinyl chloride, 160 parts of 2-methyl-5-vinylpyridine, 10 parts of styrene, 10 parts of 50 percent pure divinylbenzene, 25 parts of dioctyl phthalate, and a part of benzoyl peroxide, was daubed onto polyvinyl chloride cloth. The daubed mixture was polymerized in situ under heating at 90°C. for 5 hours, while both surfaces of the cloth were covered with cellophane. The resulting filmy product was treated with a solution composed of 50 parts of methanol and 50 parts of methyl iodide, at 25°C., for 20 hours. Thus an anion-exchange membrane containing a quaternary ammonium salt as the exchange group was obtained, which had an electrical resistance of $3.5\Omega\text{-cm}^2$, and a current efficiency of 98 percent, as determined by electrodialysis in two-chamber type cell filled with 0.5 N-NaCl aqueous solution.

The anion-exchange membrane was inserted in a two-chamber type cell, and electricity was passed through the below-specified aqueous solution therein, at a current density of $0.25 \text{ A/dm}^2$, for 3 hours to effect electrodialysis. In the meantime, the current efficiency, pH of the solution in two chambers after the electrical charging, and voltage variation during the run, were measured, with the results as shown in Table 1, and the graphs Nos. 1 and 2 of FIG. 1.

The aqueous solution:
No. 1: 0.05 N-NaCl solution in both anode and cathode chambers
No. 2: 0.05 N-NaCl solution in anode chamber, and 0.05 N-NaCl solution containing 100 ppm of sodium dodecylbenzene-sulfonate in cathode chamber.
No. 3: The cell was electrically charged for 3 hours to effect electrodialysis under the conditions of No. 2 above. Then the aqueous solution in the cell was once discarded, and refilled with the solutions of No. 2. The electrodyalysis was repeated once again (not shown in FIG. 1).

Table 1

| Aqueous Solution | Current Efficiency (%) | pH of the Solution in the Cell | |
|---|---|---|---|
| | | Anode chamber | Cathode chamber |
| No. 1 | 98 | 6.1 | 5.9 |
| No. 2 | 92 | 7.5 | 5.3 |
| No. 3 | 85 | 9.2 | 4.0 |

EXAMPLE 1

The same anion-exchange membrane employed in the above Referential Example was immersed in the electrolyte specified in Table 2 for the time also specified in the same table, and thereafter the electrodialysis was performed similarly to the Referential Example. The anode chamber of the cell was filled with 0.05 N-NaCl solution, and the cathode chamber was filled with 0.05 N-NaCl solution containing 100 ppm of sodium dodecylbenzenesulfonate. The voltage variations in the Run Nos. 3 – 6 were as shown in FIG. 2.

Table 2

| | | Electrolytic Solution | | | Results | | | |
|---|---|---|---|---|---|---|---|---|
| Run No. | Electrolyte | Average Molecular Weight | Concentration (ppm) | Treating Time (hrs.) | Adsorbed Quantity (meq/dm²) | Current Efficiency (%) | Anode Chamber | Cathode Chamber |
| | | | | | | | (pH of Solutions) | |
| 1 | Formalin condensate of sodium naphthalenesulfonate | 2,400 | 10,000 | 16 | 0.03 | 98 | 6.1 | 5.9 |
| 2 | ditto | 2,400 | 100 | 16 | 0.012 | 98 | 6.1 | 5.8 |
| 3 | Sodium polystyrenesulfonate | 15,000 | 10,000 | 16 | 0.03 | 95 | 6.8 | 5.3 |
| 4 | Sodium polyacrylate | 10,000 | 10,000 | 24 | 0.01 | 92 | 7.1 | 5.1 |
| 5 | Sodium polyvinylsulfonate | 50,000 | 3,000 | 16 | 0.009 | 95 | 6.8 | 5.3 |
| 6 | Sodium ligninsulfonate | 5,000 | 10,000 | 16 | 0.007 | 96 | 6.4 | 5.6 |

EXAMPLE 2

A pasty mixture composed of 35 parts of finely divided polyvinyl chloride, 90 parts of styrene, 10 parts of 50 percent pure divinylbenzene, 25 parts of dioctyl phthalate, and 2 parts of benzoyl peroxide, was daubed onto polyvinyl chloride cloth, and allowed to polymerize in situ at 100°C. for 4 hours, while both surfaces of the cloth were covered with cellophane. The filmy product obtained was immersed in a chloromethylating bath composed of 80 parts of carbon tetrachloride, 20 parts of chloromethyl ether, and 3 parts of anhydrous tin tetrachloride, at 25°C., for 5 hours, to be chloromethylated. The chloromethylation reaction was terminated by immersing the membrane in methanol. Thereafter the product was immersed in a saturated aqueous solution of sodium 1-amino-8-naphthol-3,6-disulfonate, for 2 hours, to be reacted at its surface portions only. The inner portion of the filmy product was treated by immersing the same in 30 percent trimethylamine aqueous solution for 8 hours. Thus, a strongly basic anion-exchange membrane having a quaternary ammonium salt as the ion-exchange group was obtained.

The membrane was used in electrodialysis under the conditions identical with those of Referential Example, with the results as shown in Table 3 below. The given probe-electrode voltages are the highest values reached during the whole run (approximately 4.5 hours after the electrical charging started).

hours after the electrical charging started, and thereafter fell gradually. At 8 hours after the charging started, the current efficiency was 95 percent, pH of the anolyte was 6.3, and that of the catholyte, 5.7, which were substantially the same to those at the initiating time of the electrodialysis.

EXAMPLE 4

TABLE 3

| Run No. | Aqueous Solution to be Treated | Results | | pH of Solution | |
|---|---|---|---|---|---|
| | | Efficiency (%) | Probe-electrode voltage (volts) | Anode Chamber | Cathode Chamber |
| 1 | DBS concentration: 200 ppm | 89 | 3.2 | 7.9 | 4.5 |
| 2 | No DBS | 98 | 0.2 | 6.1 | 5.9 |
| 3 | DBS concentration: 200 ppm | 95 | 1.2 | 6.5 | 5.7 |
| 4 | No DBS | 96 | 0.2 | 6.2 | 5.9 |

Among the above Runs, Run Nos. 1 and 2 are Controls, in which the membranes prepared as in Example 2 except that the surface treatment of this invention was omitted, were used. In Table 3, DBS stands for sodium dodecylbenzenesulfonate.

EXAMPLE 3

The filmy product obtained in Example 2 was treated in 60°C., 98 percent conc. sulfuric acid for 12 hours. The cation-exchange membrane (untreated) obtained was set in a two-chamber type cell. The cell was filled with 0.05 N-NaCl solution containing 100 ppm of dodecylpyridinium chloride as the anolyte, and 0.05 N-NaCl solution, as the catholyte, and the electrodialysis was effected at the current density of 2.5 mA/cm². The initial probe-electrode voltage was 0.25 volt, which rose to 1.76 volts after approximately 30 minutes electrical charging. The current efficiency at 8 hours after the charging was 87 percent. Then the anolyte's pH was 7.9, that of the catholyte was 4.4, and natural disturbance phenomenon was observed.

Separately, the above cation-exchange membrane was immersed in an aqueous solution containing 1,000 ppm of polyethyleneimine of the molecular weight 5,000 for 5 hours, and thereafter used in the electrodialysis similar to the above. An amount of polyethyleneimine adsorbed on the surface of the membrane was 0.014 meq/dm². The probe-electrode voltage recorded the maximum level of 0.56 volt at approximately 4

A pasty mixture composed of 95 parts of methyl acrylate, 10 parts of 50 percent pure divinylbenzene, 25 parts of dioctyl phthalate, 2 parts of benzoyl peroxide, and 100 parts of finely divided polyvinyl chloride, was daubed onto a cloth made of glass fibers, and polymerized in situ at 110°C. for 4 hours, while both surfaces of the cloth were covered with cellophane. The filmy product obtained was hydrolyzed with an alcohol solution of 8 percent caustic potash, to be converted to a weakly basic cation-exchange membrane.

Separately, the above cation-exchange membrane was immersed in quaternarized product (molecular weight: 10,000) of poly-2-methyl-5vinylpyridine (quaternarized with methyl iodide; concentration, 1,000 ppm) for 24 hours. An amount of the substance adsorbed on the surface of the membrane was 0.005 meq/dm².

The above weekly basic cation-exchange membrane and that which was surface-treated in accordance with the invention were each used in electrodialysis performed in two-chamber type cell at a current density of 2.5 mA/cm². The respective voltage variation during the run, as well as the current efficiency and pH of the solution after 24 hours electrodialysis were as given in Table 4 below. The anolyte in the cell was a liquid mixture of 0.025 N-NaCl and 0.025 N-CaCl₂. Referring to Table 4, Run Nos. 2 and 4 were performed with the anolyte of above-specified composition plus cetyltrimethylammonium chloride which was added to a concentration of 50 ppm.

TABLE 4

| Run No. | Type of Ion-Exchange Membrane | Voltage (mV) Variation | | | | | | Current Efficiency (%) | pH of Treated Liquids | |
|---|---|---|---|---|---|---|---|---|---|---|
| | | 0 (min.) | 10 (min.) | 30 (min.) | 1 (hr.) | 4 (hrs.) | 24 (hrs.) | | Anode Chamber | Cathode Chamber |
| 1 | Untreated membrane | 250 | 250 | 250 | 250 | 250 | 250 | 98 | 6.1 | 5.9 |
| 2 | ditto | 250 | 520 | 770 | 1080 | 1500 | 1300 | 88 | 8.5 | 3.8 |
| 3 | Treated membrane | 330 | 300 | 260 | 250 | 250 | 250 | 98 | 6.2 | 6.0 |
| 4 | ditto | 300 | 260 | 250 | 260 | 280 | 260 | 97 | 6.5 | 5.7 |

EXAMPLE 5

1. A polymer latex from 30 parts of styrene and 70 parts of butadiene was daubed onto glass fabric and dried. The filmy product obtained was subjected to cross-linking reaction at 20°C. for 48 hours, in a cyclizing reaction bath composed of 100 parts of ethylether and 250 parts of titanium tetrachloride. Then the product was immersed in a chloromethylating bath composed of 100 parts of chloromethyl ether, 67 parts of ethylene dichloride, and 19 parts of anhydrous aluminum chloride, at 20°C. for 5 hours. Thus chloromethylated product was further aminated in a 30 percent trimethylamine aqueous solution at 30°C. for 5 hours. Thus an anion-exchange membrane was obtained. The membrane was used in combination with the cation-exchange membrane obtained in Example 3, to form a multi-chamber type electrodialysis cell (effective area per sheet of membrane; 100 cm$^2$). Into the cell a mixed liquid of 0.03 N-NaCl, 0.01 N-CaCl$_2$, and 0.01 N-KCl containing 30 ppm of a commercial neutral detergent (chief component: sodium alkylbenzene-sulfonate), as the raw water to be treated, was passed at an average flow velocity of 10 cm·sec.$^{-1}$, and the cell voltage was set at 22.5 volts. The electrodialysis could be effected at the initial current density of 0.3 A/dm$^2$.

The electrodialysis was subsequently continued for 30 days at constant voltage. The current density variation in the meantime was as shown in Table 5, No. 1.

Separately, the electrodialysis of the above liquid mixture was performed, while a formalin condensate (molecular weight: 2,400) of sodium naphthalenesulfonate was added to the liquid mixture at a rate of 2 ppm per hour per day for the first two weeks, and thereafter at a ratio of 0.1 ppm per hour per day. The results were as shown in Table 5, No. 2. In this case, it was confirmed by adsorption test that, on the substantially surface portion of the anion-exchange membrane, at least 0.008 meq/dm$^2$ of the condensate was present.

TABLE 5

| | Current Density (A/dm$^2$) Variation | | | | | |
|---|---|---|---|---|---|---|
| | Initial Density | 1st Day | 3rd Day | 7th Day | 14th Day | 30th Day |
| No. 1 | 0.30 | 0.29 | 0.28 | 0.27 | 0.25 | 0.20 |
| No. 2 | 0.30 | 0.30 | 0.30 | 0.29 | 0.29 | 0.28 |

The current efficiency after the 30 days continuous running was 82 percent in Run No. 1, and 92 percent in Run No. 2. Those results demonstrate that the ratio of ion removal was reduced in Run No. 1 to 0.637, compared with Run No. 2. Incidentally, the ratio of ion removal was calculated in accordance with the equation below:

$$\text{Ratio of Percent Ion Removal} = \frac{\text{Current density after 30th day in No. 1} \times \text{Current efficiency after 30th day in No. 1}}{\text{Current density after 30th day in No. 2} \times \text{Current efficiency after 30th day in No. 2}}$$

EXAMPLE 6

The filmy product obtained in Example 2 was immersed in a chlorosulfonic acid solution consisting of 1 part of carbon tetrachloride and 2 parts of at least 90 percent pure chlorosulfonic acid, at 10°C. for 2 hours. Thus chlorosulfonic acid groups were uniformly introduced throughout the inside of the filmy product. The product was then immersed in a 5 percent aqueous solution of polyethyleneimine (molecular weight: 30,000) for 16 hours, to fix the polyethyleneimine on the surface of the membrane through an acid amide bond. The product was then further immersed in 1N-NaOH aqueous solution to convert the unreacted chlorosulfonic acid groups present in the product to sulfonic acid groups. Thus a cation-exchange membrane with polyethyleneimine fixed on its surfaces was obtained.

The membrane was set in a two-chamber type cell, and electrodialysis was effected therein at a current density of 25 mA/cm$^2$, using as the anolyte 0.05 N-NaCl aqueous solution containing 200 ppm of acetate of dodecylamine, and as the catholyte, 0.05 N-NaCl aqueous solution. The probe-electrode voltage of the cation-exchange membrane was 0.32 volt when the electrical charging started, which rose to the maximum level of 0.59 volt after 4.5 hours running, and thereafter gradually fell. In contrast, when the cation-exchange membrane which was not surface-treated was used in the electrodialysis under identical conditions, the probe-electrode voltage was initially 0.31 volt, which rose to 2.15 volts after 30 minutes.

EXAMPLE 7

To a mixture of 70 parts of butyl ester styrenesulfonate acid, 20 parts of styrene, and 10 parts of 50 percent pure divinyl benzene, 60 parts of dioctyl phthalate and 2 parts of benzoyl peroxide were added, and the resulting mixture was poured into 0.5-mm wide space between two sheets of glass, to be subsequently polymerized at 80°C. for 5 hours. Then the glass sheets were removed, and as sheet of filmy product was obtained. The product was heated at 60°C. for 12 hours in 8 percent methanol solution of caustic potash, to hydrolyze the ester linkage, and then thoroughly washed with 1N-HCl and 0.5N-NaCl. Thus a cation-exchange membrane was immersed in a mixed liquid composed of 2 parts of polyethyleneimine (molecular weight: 5,000), a part of benzophenone and 97 parts of methanol, for 30 minutes. Then one surface of the membrane was covered with quartz plate, and irradiated for an hour with ultraviolet rays from an ultraviolet ray lamp, model SHLS-1002 B manufactured by Toshiba Co., Japan at a distance of 5 cm. The membrane was thoroughly washed first with methanol, and then again with 1N-HCl and 0.5N-NaCl. The grafted quantity of polyethyleneimine was 0.06 meq/cm$^2$.

This membrane was set in a two-chamber type cell with its photo-irradiated side facing the anode, and electrodialysis was effected for 12 hours at the current density of 30 mA/cm$^2$, using 0.05N-CaCl$_2$ as the catholyte, and 0.05N-CaCl$_2$ containing 120 ppm of cetyltrimethylammonium chloride as the anolyte. Thus measured voltage variation, current efficiency, and pH of the solutions in two chambers after 12 hours running, were as given in Table 6 below. As a control, the same experiment was repeated with the membrane not subjected to the above electrolyte-fixing treatment. The results are also given in Table 6, as Run No. 2.

Table 6

| Run No. | Type of Ion Exchange Membrane | Voltage (mV) Variation | | | | | Current Efficiency (%) | pH of Treated Liquids | |
|---|---|---|---|---|---|---|---|---|---|
| | | 0 (min.) | 30 (min.) | 2 (hrs.) | 8 (hrs.) | 12 (hrs.) | | Anode Chamber | Cathode Chamber |
| 1 | Treated membrane | 670 | 750 | 780 | 820 | 890 | 95 | 6.2 | 6.0 |
| 2 | Untreated membrane | 620 | 1050 | 1550 | 1950 | 1620 | 87 | 8.5 | 3.9 |

EXAMPLE 8

A pasty mixture composed of 180 parts of styrene, 20 parts of 50 percent pure divinyl benzene, 25 parts of dioctyl phthalate, 2 parts of benzoyl peroxide, and 100 parts of finely divided polyvinyl chloride, was daubed onto polyethylene net. Then both surfaces of the net were covered with cellophane, and the mixture daubed thereon was polymerized in situ at 110°C. for 4 hours. The filmy product obtained was chloromethylated similarly to Example 2, to have chloromethyl groups introduced. Further the product was immersed in 40 percent dimethylamine aqueous solution for 8 hours, to be converted to a weakly basic anion-exchange membrane (untreated).

Separately, a liquid mixture composed of 20 parts of methacrylic acid, 78 parts of methanol and 2 parts of benzophenone was uniformly sprayed onto one surface of the anion-exchange membrane prepared as above, and the surface was covered with a quartz plate to prevent evaporation of the liquid mixture, while it was irradiated from an ultraviolet ray lamp, model SHL-100 uv (product of Toshiba Co., Japan) placed 5 cm apart from the surface, for 30 minutes. Then the photo-irradiated membrane was thoroughly washed with 0.1N-NaOH aqueous solution, remove the homopolymer of acrylic acid and unreacted acrylic acid. Thus an anion-exchange membrane treated in accordance with this invention was obtained. On the surface of such anion-exchange membrane, a grafted polymer of 67 in average degree of polymerization was present, and the cation-exchange group introduced by the grafting was 0.07 meq/dm$^2$.

The untreated and treated membranes were separately set in two similar two-chamber type cells, the photo-irradiated surface of the treated membrane facing the cathode. As to each of the cells, the probe-electrode voltage variation and current efficiency after 24 hours running were measured, when 0.04 NaCl solution was poured into the two chamber parted by the membrane (Run Nos. 1 and 3 of Table 7) and sodium oleate was added to the NaCl solution in the cathode chamber only, to a concentration of 100 ppm (Run Nos. 2 and 4), and the cells were electrically charged. The results were as shown in Table 7 below.

TABLE 7

| Run No. | Type of Ion-Exchange Membrane | Voltage (mV) Variation | | | | | | | Current Efficiency (%) |
|---|---|---|---|---|---|---|---|---|---|
| | | 0 (min.) | 10 (min.) | 30 (min.) | 1 (hr.) | 4 (hrs.) | 18 (hrs.) | 24 (hrs.) | |
| 1 | Untreated membrane | 280 | 280 | 280 | 280 | 280 | 280 | 280 | 98 |
| 2 | ditto | 280 | 290 | 300 | 315 | 360 | 410 | 400 | 89 |
| 3 | Treated membrane | 295 | 290 | 290 | 290 | 290 | 290 | 290 | 97 |
| 4 | ditto | 295 | 290 | 290 | 290 | 300 | 310 | 315 | 96 |

EXAMPLE 9

A pasty mixture composed of 95 parts of styrene, 5 parts of 50 percent pure divinylbenzene, 100 parts of finely divided polyvinyl chloride, 25 parts of dioctyl phthalate, and 2 parts of benzoyl peroxide, was daubed onto a sheet of glass. The glass sheet was heated to 110°C. for 5 hours with the both surfaces covered with cellophane, so that the daubed mixture thereon was polymerized in situ. The filmy product obtained was immersed in benzoylating bath composed of 500 parts of carbon tetrachloride, 40 parts of anhydrous aluminium chloride and 34 parts of benzoyl chloride, at room temperature for 4 hours, so as to be benzoylated. Then the product was washed with methanol, dried, and sulfonated with 60°C. 98 percent conc. sulfuric acid for 8 hours, to be converted to a cation-exchange membrane (untreated).

Separately, this H-type cation-exchange membrane was further washed with methanol, immersed in 50 percent methanol solution of 2-methyl-5-vinyl-pyridine for 1 minute, and irradiated with an ultraviolet ray lamp Model SHLS-1002B of Toshiba Co., Japan, placed 5 cm apart from the membrane surface which was covered with a quartz plate, for 10 minutes. Thus a cation-exchange membrane on which the specified electrolyte was fixed was obtained. On the irradiated surface, 0.03 meq./dm$^2$ of poly(2-methyl-5-vinylpyridine) was present.

Then the membrane was immersied alternately in 1N-HCl solution and 0.5N-NaCl solution until it became sufficiently equilibrated. Thereafter the membrane was set in a two-chamber type cell the cathode chamber of which was filled with 0.05N-NaCl and the anode chamber, with 0.05N-NaCl containing 150 ppm of tetradecylpyridinium chloride. The treated membrane was set with its photo-irradiated surface facing the anode chamber. Thus the electrodialysis was effected at a current density of 2.5 mA/cm². The voltage variation during the electrical charging, and current efficiency and pH of the solutions in the anode and cathode chambers after 24 hours running were as shown in Table 8 below.

cial neutral detergent (composed chiefly of sodium dodecylbenzenesulfonate) as the catholyte, and 0.05N-NaCl solution as the anolyte. The performance of the membrane measured similarly to Example 9 was as shown in Table 9, in which Run No. 1 is a control using the untreated membrane.

TABLE 8

| Run No. | Type of Ion-Exchange Membrane | Voltage (mV) Variation | | | | | Current Efficiency (%) | pH of Treated Liquids | |
|---|---|---|---|---|---|---|---|---|---|
| | | 0 (min.) | 30 (min.) | 2 (hrs.) | 8 (hrs.) | 24 (hrs.) | | Anode Chamber | Cathode Chamber |
| 1 | Untreated membrane | 350 | 600 | 850 | 1020 | 1250 | 92 | 8.8 | 3.6 |
| 2 | Treated membrane | 490 | 500 | 515 | 580 | 650 | 98 | 6.5 | 6.1 |

TABLE 9

| Run No | Type of Ion-Exchange Membrane | Voltage (mV) Variation | | | | | Current Efficiency (%) | pH of Treated Liquids | |
|---|---|---|---|---|---|---|---|---|---|
| | | 0 (min.) | 30 (min.) | 2 (hrs.) | 16 (hrs.) | 24 (hrs.) | | Anode Chamber | Cathode Chamber |
| 1 | Untreated membrane | 295 | 320 | 340 | 390 | 420 | 91 | 7.5 | 4.9 |
| 2 | Treated membrane | 315 | 315 | 320 | 330 | 345 | 97 | 6.4 | 6.1 |

EXAMPLE 10

The same filmy product obtained in Example 1 was chloromethylated in a chloromethylating bath composed of 100 parts of carbon tetrachloride, 20 parts of chloromethyl ether, and 3 parts of tin tetrachloride, washed with methanol, and then immersed in 30 percent trimethylamine aqueous solution for 5 hours, to form a strongly basic anion-exchange membrane (untreated).

This anion-exchange membrane was immersed alternately in 1.0N-HCl and 0.5N-NH₄OH solutions until complete equilibrium was obtained. Thus the nature of the membrane was rendered equilibrated. One surface of the Cl-type membrane was immersed in a liquid mixture of 2 parts of polystyrenesulfonic acid obtained through sulfonation of polystyrene (molecular weight: 5,000) with 98 percent conc. sulfuric acid, 1 part of acrolein, and 97 parts of water, for 10 minutes, and then covered with a quartz plate. Subsequently the surface was irradiated for an hour with an ultraviolet ray lamp, Model SHLS-1002B of Toshiba Co., Japan, placed 5 cm apart from the covered surface. The membrane was thoroughly washed with water, and again alternately immersed in 0.5N-NaCl and 1.0N-HCl solutions to be given an equilibrium property. Thus an electrolyte-fixed anion-exchange membrane (treated) was obtained, one surface of which held 0.09 meq/dm² of polystyrenesulfonic acid. This ion-exchange membrane was set in a two-chamber type cell with its photo-irradiated surface facing the cathode. Electrodialysis was effected in the manner similar to Example 9. using 0.05N-NaCl solution containing 200 ppm of commer-

EXAMPLE 11

Commercial polyethyleneimine (molecular weight: 100,000) was dried by freeze-drying, and converted to anhydrous polyethyleneimine. 43 parts of the anhydrous polyethyleneimine were dissolved in 100 parts of methanol, 28 parts of epichlorohydrin were added and 50 parts of methanol were further added. The resulting mixture was poured onto a glass sheet covered with a glass fabric, and dried for 2 hours at 60°C. to form an anion-exchange membrane (untreated), which was sufficiently immersed in 1N-HCl and 0.5N-NH₄OH alternately, to be given an equilibrium property. Thereafter the membrane was further immersed in 0.05N-NaCl solution.

Separately, the anion-exchange membrane, identical with the above was immersed in a liquid mixture of 1 part of benzoyl peroxide, 5 parts of methacrylic acid, and 94 parts of methanol, for one minute, and then irradiated for 20 minutes with the ultraviolet ray lamp similarly to Example 9. Thus an anion-exchange membrane on which the specified electrolyte was fixed was obtained (treated membrane), one surface of which retained 0.03 meq/dm² of methacrylic acid as graft-polymerized. The membrane was thoroughly washed with methanol, and then given the equilibrium property through the treatments similar to those given to the untreated membrane.

The untreated membrane and treated membrane were separately set in two similar two-chamber type cells, in which electrodialysis was performed similarly to Example 9. 0.05N-NaCl was used as the anolyte, and 0.05N-NaCl aqueous solution containing 200 ppm of commercial neutral detergent (chief component: sodium dodecylbenzene-sulfonate), as the catholyte. The performance of the membranes was measured similarly to Example 9, with the results as given in Table 10 below.

lution containing 300 ppm of commercial invert soap (dodecyltrimethylammonium chloride), and as the catholyte, 0.08N-NaCl aqueous solution. The data obtained through the experiment were as shown in Table 11 below.

TABLE 10

| Run No. | Type of Ion-Exchange Membrane | Voltage (mV) Variation | | | | | Current Efficiency (%) | pH of Treated Liquids | |
|---|---|---|---|---|---|---|---|---|---|
| | | 0 (min.) | 30 (min.) | 2 (hrs.) | 8 (hrs.) | 24 (hrs.) | | Anode Chamber | Cathode Chamber |
| 1 | Untreated membrane | 290 | 310 | 320 | 340 | 380 | 83 | 7.1 | 5.5 |
| 2 | Treated membrane | 300 | 300 | 305 | 310 | 318 | 88 | 6.3 | 6.0 |

TABLE 11

| Run No. | Type of Ion-Exchange Membrane | Quantity of Cation-Exchange Group Present on Membrane Surface (meq/dm²) | Voltage (mV) Variation | | | | Current Efficiency (%) | pH of Treated Liquids | |
|---|---|---|---|---|---|---|---|---|---|
| | | | 0 (min.) | 30 (min.) | 4 (hrs.) | 24 (hrs.) | | Anode Chamber | Cathode Chamber |
| 1 | Untreated membrane | — | 250 | 1350 | 1100 | 780 | 82 | 3.8 | 8.5 |
| 2 | Treated membrane No. 1 | 0.09 meq/dm² | 250 | 350 | 410 | 480 | 96 | 6.0 | 6.2 |
| 3 | Treated membrane No. 2 | 0.02 meq/dm² | 260 | 380 | 450 | 520 | 94 | 5.7 | 6.4 |

EXAMPLE 12

The untreated cation-exchange membranes as obtained in Example 3 were each daubed with the electrolyte of the below-specified composition, covered airtightly with cellophane, and irradiated for 240 hours from Co 60 of 3,000 curies as the radiation source, at a distance of 20 cm. Then the membranes were thoroughly washed with water.

Compositions of electrolytes:

1. 1 percent aqueous solution of polyethyleneimine (molecular weight: 10,000)
2. 1 percent methanol solution of Cl-type quaternary salt of poly-4-vinylpyridine (molecular weight: 150,000)

The treated membranes thus obtained (the polyethyleneimine-fixed membrane being labeled No. 1, and the other No. 2) and the untreated membrane were separately set in three similar two-chamber type cells. In all cells electrodialysis was effected similarly to Example 9, using as the anolyte 0.08N-NaCl aqueous so-

EXAMPLE 13

Electrolytes of below-specified compositions were each daubed onto the surfaces of anion-exchange membranes (untreated) obtained in the Referential Example, and irradiated similarly to Example 12. Thus the electrolytes were fixed in situ. Thus an anion-exchange membrane fixed with polystyrenesulfonic acid (treated membrane No. 1), and that fixed with the condensate of naphthalenesulfonic acid formalin (treated membrane No. 2) were obtained. Both were subsequently thoroughly washed with water.

Compositions of electrolytes:

1. 1 percent aqueous solution of polystyrenesulfonic acid (molecular weight: 150,000)
2. 1 percent aqueous solution of condensate (molecular weight: 2,400) of naphthalenesulfonic acid and formalin The above two membranes were used in electrodialysis similarly to Example 12, using as the anolyte 0.05N-NaCl aqueous solution containing 250 ppm of commercial neutral detergent composed chiefly of sodium alkyl-benzenesulfonate. The measurements were taken similarly to Example 9, with the results as given in Table 12 below.

Table 13. The treating liquids employed in the electrodialysis were: 0.05 N- KCl aqueous solution as the anolyte, and 0.05 N- KCl solution containing 100 ppm of sodium dodecyl benzenesulfonate as the catholyte.

TABLE 12

| Run No. | Type of Ion-Exchange Membrane | Quantity of Treating Agent (meq/dm²) | Voltage (mV) Variation | | | | | Current Efficiency (%) | pH of Treated Liquids | |
|---|---|---|---|---|---|---|---|---|---|---|
| | | | 0 (min.) | 30 (min.) | 2 (hrs.) | 4 (hrs.) | 24 (hrs.) | | Anode Chamber | Cathode Chamber |
| 1 | Untreated membrane | — | 210 | 15,000 | 13,000 | 10,000 | 5,000 | 76 | 9.5 | 3.8 |
| 2 | Treated membrane No. 1 | 0.01 meq/dm² | 205 | 800 | 1,300 | 1,200 | 700 | 90 | 7.0 | 5.2 |
| 3 | Treated membrane No. 2 | 0.002 meq/dm² | 220 | 210 | 230 | 240 | 240 | 98 | 6.2 | 6.0 |

Table 13

| Run No. | Type of Ion-Exchange Membrane | Quantity of Treating Agent (meq/dm²) | Voltage (mV) Variation | | | | | Current Efficiency (%) | pH of Treated Liquids | |
|---|---|---|---|---|---|---|---|---|---|---|
| | | | 0 (min.) | 30 (min.) | 2 (hrs.) | 4 (hrs.) | 24 (hrs.) | | Anode Chamber | Cathode Chamber |
| 1 | Untreated membrane | — | 220 | 12,000 | 9,500 | 8,000 | 4,000 | 81 | 9.5 | 3.9 |
| 2 | Treated membrane No. 1 | 0.03 | 230 | 280 | 350 | 380 | 500 | 97 | 6.5 | 5.8 |
| 3 | Treated membrane No. 2 | 0.04 | 220 | 235 | 250 | 280 | 320 | 98 | 6.4 | 6.0 |

EXAMPLE 14

The anion-exchange membrane (untreated as obtained in the Referential Examples was fixed on 0.05 cm thick polyethylene film with vinyl adhesive tape, and onto which the electrolyte of the below-specified composition was caused to be present by the below-specified treatment. Then the membrane was subjected to the corona discharge effected with a corona discharge equipment (product of Kasuga Electric Co., Japan, 1 KW type) at a frequency of 110 KHZ ± 5 KHZ and output voltage of 3KV, with the film feed rate of 10 m/min. The anion-exchange membranes treated in accordance with this invention (that subjected to the treatment (1) below is labeled as treated membrane No. 1, and the other, treated membrane No. 2) were obtained.

1. Methacrylic acid: 20 parts  
   Benzophenone: 1 part  } The membrane was immersed in the mixture for 1 minute  
   Methanol: 60 parts
2. Ligninsulfonic acid: 5 parts  
   Acrolein: 1 part  } The mixture was uniformly sprayed onto the membrane surface  
   Methanol: 94 parts The properties of those membranes were measured similarly to Example 9, with the results as given in

EXAMPLE 15

The electrolytes of below-specified compositions were fixed onto the cation-exchange membranes (untreated) as obtained in Example 3, through the procedures similar to those described in Example 14. The cation-exchange membrane obtained treated with the electrolyte (1) below was labeled treated membrane No. 1, and that treated with the electrolyte (2), treated membrane No. 2.

Both membranes were thoroughly washed with water, given equilibrium property through alternate immersions in 1.0 N- HCl and 0.5 N- NaCl, and used in the test similarly to Example 14. The results were as given in Table 14 below. The treating liquid was 0.05 N- NaCl, the anolyte only containing 100 ppm of dodecylpyridinium chloride.

1. 2-methyl-5-vinyl-pyridine: 50 parts  } daubed uniformly onto the membrane surface with absorbent cotton  
   Methanol: 50 parts  
2. Polyethyleneimine: 5 parts  
   α,α'-Azoisobutyronitrile: 1 part  } 5 minutes immersion  
   Methanol: 50 parts

TABLE 14

| Run No. | Type of Ion-Exchange Membrane | Quantity of Treating Agent (meq/dm²) | Voltage (mV) Variation | | | | | Current Efficiency (%) | pH of Treated Liquids | |
|---|---|---|---|---|---|---|---|---|---|---|
| | | | 0 (min.) | 30 (min.) | 2 (hrs.) | 4 (hrs.) | 24 (hrs.) | | Anode Chamber | Cathode Chamber |
| 1 | Untreated membrane | — | 220 | 1,310 | 1,600 | 1,200 | 850 | 79 | 8.5 | 4.8 |
| 2 | Treated membrane No. 1 | 0.02 | 230 | 280 | 300 | 350 | 500 | 97 | 6.2 | 6.0 |
| 3 | Treated membrane No. 2 | 0.08 | 220 | 350 | 490 | 550 | 620 | 96 | 6.5 | 5.8 |

EXAMPLE 16

A 0.02-cm thick polyvinyl chloride sheet was immersed in a mixed solution composed of 90 parts of styrene, 10 parts of 50 percent pure divinylbenzene, 25 parts of dioctyl phthalate, 2 parts of benzoyl peroxide, and 20 parts of n-hexane as a diluent, for 8 hours. Then both surfaces of the sheet were covered with cellophane, and the solution on the sheet was polymerized in situ under heating. The filmy product obtained was treated similarly to Example 14 and the below-specified electrolytes were fixed thereon to form two types of membranes.

| | | |
|---|---|---|
| 1. 4-Vinylpyridine: | 50 parts | daubed uniformly onto the membrane surface with absorbent cotton |
| Methanol: | 50 parts | |
| Benzophenone: | 1 part | |

| | | |
|---|---|---|
| 2. Polyethyleneimine: | 3 parts | sprayed uniformly onto the membrane surface |
| α,α'-Azobisisobutyronitrile: | 1 part | |
| Ethanol: | 60 parts | |

The membranes were thoroughly washed with methanol, were immersed in a solution composed of 2 parts of at least 90 percent pure chlorosulfonic acid and 1 part of carbon tetrachloride for 2 hours at a 4°C., and washed thoroughly with carbon tetrachloride. The membranes were further immersed in 1.0 N-NaOH for 5 hours, thereby providing cation-exchange membranes having sulfonic acid groups. The membrane fixed with the above electrolyte (1) was labeled treated membrane No. 1, and that with the electrolyte (2), treated membrane No. 2. Both were given an equilibrium property by alternate immersion in 1.0N-HCl and 0.5N-NaCl, and their performance as the cation-exchange membranes was measured as in Example 9, with the results shown in Table 15. The treating liquid employed was 0.05 N-NaCl, the anolyte further containing 300 ppm of a detergent composed mainly of dodecyl pyridinium chloride. In Table 15, Run No. 1 is a control, in which the cation-exchange membrane prepared similarly to the other two, except that the Corona discharge treatment was omitted, was used.

TABLE 15

| Run No. | Type of Ion-Exchange Membrane | Quantity of Treating Agent (meq/dm²) | Voltage (mV) Variation | | | | Current Efficiency (%) | pH of Treated Liquids | |
|---|---|---|---|---|---|---|---|---|---|
| | | | 0 (min.) | 30 (min.) | 4 (hrs.) | 24 (hrs.) | | Anode Chamber | Cathode Chamber |
| 1 | Untreated Membrane | — | 190 | 890 | 780 | 650 | 76 | 7.8 | 4.4 |
| 2 | Treated membrane No. 1 | 0.009 | 230 | 320 | 380 | 480 | 92 | 6.5 | 5.8 |
| 3 | Treated membrane No. 2 | 0.03 | 190 | 250 | 280 | 390 | 91 | 6.3 | 6.0 |

EXAMPLE 17

Demineralization of pulp-treated liquid containing 3 percent of acetic acid, 150 ppm of inorganic salts such as of sodium, potassium, calcium, etc., 5 percent of xylose, and 0.5 percent of lignin sulfonic acid, was attempted, using the electrodialysis cell employed in Example 5. As the cation-exchange membrane, that obtained in Example 3, and as the anion-exchange membrane, that obtained in Example 2, were used. The raw water of above composition was caused to flow through the demineralization chamber in the cell, and 0.2N-NaCl aqueous solution was passed through the concentration chamber, and recycled in the electrodialysis cell. The electrodialysis was effected for 5 hours at a constant voltage of 42.5 volts, with the results as shown in Table 16, as Run No. 1. Run No. 2 is the control in which the anion-exchange membrane obtained in Example 2 which was not surface-treated with sodium 1-amino-β-naphthal-3,6-disulfonate (untreated membrane) was used in the similar experiment. In the Control Run, low molecular weight lignin sulfonic acid present in the raw water entered through the membrane, markedly increasing the electrical resistance of the membrane. The current efficiency was 82 percent in the Control Run, while it was 92 percent with the treated membrane of this invention.

Also a cation-exchange membrane not treated with polyethyleneimine (untreated membrane) was prepared otherwise similarly to the above procedures. The membranes were tested similarly to Example 16, with the results given in Table 17.

TABLE 17

| Ion-Exchange Membrane | Voltage (mV) Variation | | | | Current Effici-ency (%) | pH of Treated Liquids | |
|---|---|---|---|---|---|---|---|
| | 0 (min.) | 30 (min.) | 4 (hrs.) | 24 (hrs.) | | Anode Chamber | Cathode Chamber |
| Treated membrane | 295 | 315 | 330 | 350 | 92 | 6.2 | 5.9 |
| Untreated membrane | 305 | 850 | 1210 | 680 | 72 | 8.0 | 4.2 |

TABLE 16

| Run No. | Current Density (A/dm$^2$) Variation (hrs.) | | | | After Demineralization | |
|---|---|---|---|---|---|---|
| | 0 | 1 | 2 | 5 | Inorganic Ion Content (ppm) | Acetic Acid Content (%) |
| 1 | 0.35 | 0.20 | 0.10 | 0.001 | 2 | 0.01 |
| 2 | 0.35 | 0.10 | 0.005 | 0.000 | 25 | 0.70 |

EXAMPLE 18

A pasty mixture composed of 95 parts of styrene, 5 parts of divinylbenzene, 100 parts of finely divided polyvinyl chloride, 25 parts of dioctyl phthalate, and 1.5 parts of benzoyl peroxide, was daubed onto a polyvinyl chloride cloth, and allowed to polymerize in situ under heating, to provide a starting cation-exchange membrane.

The membrane was immersed in a solution composed of 600 g of carbon tetrachloride, 70 g of chloromethyl ether, and 5 g of zinc tetrachloride, at 25°C. for 8 hours under stirring, and thereafter thoroughly washed with methanol. Further the membrane was immersed in a solution composed of 25 mols of phosphorus trichloride and 1.2 mols of anhydrous aluminium chloride at room temperature for 8 hours, washed thoroughly with water and immersed in a 5 percent polyethyleneimine aqueous solution at room temperature for 5 hours. As a result 0.05 meq/dm$^2$ of polyethyleneimine was present on the membrane surface. The product was washed with water, immersed in 1N-NaOH aqueous solution for 6 hours, and then in 1N-HCl and phosphorus acid groups were introduced into the membrane (treated membrane).

EXAMPLE 19

A pasty mixture composed of 90 parts of styrene, 90 parts of methyl methacrylate, 20 parts of 50 percent pure divinylbenzene, 4 parts of benzoyl peroxide, and 100 parts of finely divided polyvinyl chloride, was daubed onto a polyvinyl chloride cloth, and allowed to polymerize in situ at 110°C. for 3 hours, while both surfaces of the cloth were covered with cellophane. The product obtained was immersed in a chloromethylating both composed of 80 parts of carbon tetrachloride, 20 parts of chloromethyl ether, and 3 parts of anhydrous tin tetrachloride, at 25°C. for 5 minutes. As a result substantially the surface portion only of the membrane was chloromethylated. The reaction was terminated by placing the membrane in methanol. The membrane was then immersed in the below-specified amino compound for 4 hours to effect substantially surficial amination reaction, washed thoroughly with methanol, and allowed to dry by standing at room temperature. Into the membrane, chlorosulfonic acid groups were introduced as it was immersed in a chlorosulfonating bath composed of 2 parts of chlorosulfonic acid and 1 part of carbon tetrachloride, at 4°C. for 3 hours. The chlorosulfonic acid groups were converted to sodium sulfonate, as the membrane was immersed in 1N-NaOH at 25°C. for 4 hours.

The membrane was used in electrodialysis effected in acrylic resin-made two-chamber type cell. As the anolyte, 0.04 N-KCl solution containing 100 ppm of dodecyltrimethylammonium chloride, and as the catholyte, 0.04 N-KCl solution, were used. The electrodialysis was carried out at 25.0°C., at a current density of 3 mA/cm$^2$. The voltage variation after 1,2, and 4 hours of running, current efficiency, and pH of the treated liquids, were measured.

Also the membrane treated as above, except that the aminating treatment after the chloromethylating reaction was omitted, was used as the untreated membrane in Control run. The results were shown in Table 18.

TABLE 18

| Run No. | Treatment Ion-Exchange Membrane | Voltage (mV) Variation | | | | Current Effici-ency (%) | pH of Treated Liquids | |
|---|---|---|---|---|---|---|---|---|
| | | 0 | 1 (hr.) | 2 (hrs.) | 4 (hrs.) | | + | − |
| 1 | Untreated membrane | 320 | 580 | 650 | 940 | 86 | 8.3 | 4.0 |
| 2 | 16 Hours immersion in 1.0N-NH$_4$OH | 330 | 345 | 370 | 390 | 92 | 6.4 | 5.6 |

TABLE 18

| Run No. | Treatment Ion-Exchange Membrane | Voltage (mV) Variation 0 | 1 (hr.) | 2 (hrs.) | 4 (hrs.) | Current Efficiency (%) | pH of Treated Liquids + | pH of Treated Liquids − |
| --- | --- | --- | --- | --- | --- | --- | --- | --- |
| 3 | 5 Hours immersion in 30 % trimethylamine aqueous solution | 325 | 345 | 355 | 368 | 95 | 6.2 | 5.9 |
| 4 | 12 Hours immersion in 5 % polyethyleneimine (molecular weight: 5,000) | 335 | 340 | 340 | 340 | 98 | 6.1 | 5.9 |
| 5 | 8 Hours immersion in 5 % poly-4-vinylpyridine (molecular weight: 50,000) solution in alcohol | 328 | 330 | 332 | 340 | 97 | 6.2 | 6.0 |
| 6 | The membrane of Run No. 5 was further immersed for 3 hours in 1:1 $CH_3$ I-methanol solution | 340 | 340 | 340 | 345 | 98 | 6.1 | 6.0 |
| 7 | 16 Hours immersion in 5 % ethylene diamine aqueous solution | 326 | 340 | 350 | 360 | 94 | 6.3 | 5.8 |

What we claim is:

1. A process for the deionization of electrolyte aqueous solutions containing ionic organic matters having a molecular weight of 100 to 300, which consists essentially of disposing cation-exchange membranes and anion-exchange membranes alternately in said electrolyte solutions to thereby form a plurality of chambers consisting of alternating diluting and concentrating chambers by using the disposed cation-exchange and anion-exchange membranes as partition walls, each of said ion-exchange membranes consisting of an insoluble, infusible synthetic organic polymer having dissociable ionic groups chemically bonded thereto and having the pores across the membranes, at least one substantial surface of each of said ion-exchange membranes intimately retaining an electrolytic substance having an opposite electric charge to the charge of the ion-exchange group of said ion-exchange membrane and being incapable of passing through the pores of the ion-exchange membrane, each of said ion-exchange membranes employed as partition walls being so disposed that it should direct at least said surface intimately retaining said electrolytic substance toward the side of the diluting chamber; and passing a direct current in series through said chambers to thereby transfer cations and anions from the electrolyte solution of the diluting chambers into the electrolyte solution of the concentrating chambers.

2. The process of claim 1, wherein the amount of said electrolytic substance present in said substantial surface is $2 \times 10^{-6}$ m.eq. to 0.5 m.eq. per $dm^2$ of the surface of said ion-exchange membrane, on the basis of the amount of the dissociable groups of the electrolytic substance.

3. The process of claim 1, wherein said electrolytic substance has a molecular weight of at least about 400, and is intimately retained on the substantial surface by being adsorbed mainly by an electrostatic force.

4. The process of claim 1, wherein said electrolytic substance is intimately retained on said substantial surface by being chemically bonded to said substantial surface through a covalent bond.

* * * * *